US010497321B2

(12) United States Patent
Cui et al.

(10) Patent No.: US 10,497,321 B2
(45) Date of Patent: Dec. 3, 2019

(54) IMAGE PROCESSING METHOD AND DEVICE THEREOF

(71) Applicant: Wuhan China Star Optoelectronics Technology Co., Ltd., Wuhan, Hubei (CN)

(72) Inventors: Xiaojuan Cui, Guangdong (CN); Xiang Yang, Guangdong (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/996,808

(22) Filed: Jun. 4, 2018

(65) Prior Publication Data

US 2019/0130851 A1 May 2, 2019

Related U.S. Application Data

(63) Continuation of application No. PCT/CN2018/074611, filed on Jan. 30, 2018.

(30) Foreign Application Priority Data

Oct. 31, 2017 (CN) .......................... 2017 1 1047290

(51) Int. Cl.

| | |
|---|---|
| ***G09G 3/34*** | (2006.01) |
| ***G09G 3/20*** | (2006.01) |
| ***H04N 9/64*** | (2006.01) |
| ***H04N 9/77*** | (2006.01) |

(Continued)

(52) U.S. Cl.
CPC ......... *G09G 3/3406* (2013.01); *G09G 3/2003* (2013.01); *G09G 2310/06* (2013.01); *G09G 2320/0646* (2013.01); *G09G 2320/0666* (2013.01)

(58) Field of Classification Search
CPC combination set(s) only.
See application file for complete search history.

(56) References Cited

U.S. PATENT DOCUMENTS

2008/0150863 A1* 6/2008 Morisue ............... G09G 3/3406 345/88
2010/0007599 A1* 1/2010 Kerofsky ............ G09G 3/3413 345/102

(Continued)

FOREIGN PATENT DOCUMENTS

CN 1808559 A 7/2006
CN 102122501 A 7/2011

(Continued)

*Primary Examiner* — Wesner Sajous
(74) *Attorney, Agent, or Firm* — Hemisphere Law, PLLC; Zhigang Ma

(57) ABSTRACT

The embodiments of the disclosure disclose an image processing method and an device thereof, by detecting the saturated color ratio of the current frame picture of the acquired target image to acquire a corresponding PWM duty ratio and gain coefficient, the method can intelligently control the backlight brightness of the display picture and the gain coefficient during the format conversion to solve the problem that the unsaturated color is darker than the saturated color when the picture is displayed, and the display effect of the terminal is improved.

10 Claims, 5 Drawing Sheets

(51) Int. Cl.
*H04N 5/57* (2006.01)
*H04N 1/60* (2006.01)

(56) References Cited

U.S. PATENT DOCUMENTS

| | | | | |
|---|---|---|---|---|
| 2012/0001947 | A1* | 1/2012 | Chu-Ke | G09G 3/3406 345/690 |
| 2013/0176488 | A1* | 7/2013 | Nakashima | H04N 7/014 348/452 |
| 2013/0176798 | A1* | 7/2013 | McCombs | G11C 8/18 365/191 |
| 2016/0148579 | A1* | 5/2016 | Kimura | G09G 3/3607 345/694 |
| 2017/0061897 | A1* | 3/2017 | Zhang | G09G 3/3426 |
| 2017/0061901 | A1* | 3/2017 | Zhang | G09G 3/3426 |
| 2018/0148579 | A1* | 5/2018 | Koyama | C09C 3/06 |
| 2018/0151153 | A1* | 5/2018 | Heo | H04N 1/6002 |

FOREIGN PATENT DOCUMENTS

| | | | |
|---|---|---|---|
| CN | 104867471 | A | 8/2015 |
| CN | 106128405 | A | 11/2016 |
| CN | 106775550 | A | 5/2017 |

* cited by examiner

IMAGE PROCESSING METHOD AND DEVICE THEREOF

RELATED APPLICATIONS

This application is a continuation application of PCT Patent Application No. PCT/CN2018/074611, filed Jan. 30, 2018, which claims the priority benefit of Chinese Patent Application No. 201711047290.5, filed Oct. 31, 2017, which is herein incorporated by reference in its entirety.

FIELD OF THE DISCLOSURE

The disclosure relates to the field of electronic technology, and in particular to an image processing method and device thereof.

BACKGROUND

With the continuous development and improvement of electronic technologies, terminals such as mobile phones and tablet computers have become an indispensable part of people's lives. People can not only use these terminals to communicate, but also can play video, file, camera, play games, and more.

As people continue to pursuit the display on high brightness and energy saving, four primary colors (Red Green Blue White, RGBW) algorithm system came into being, that is, the original primary colors (Red Green Blue, RGB) sub-pixel system becomes the RGBW sub-pixel system; first, the received image data is converted from the gray-scale domain to the luminance domain to improve the calculation precision, and then the received RGB data is converted into the RGBW domain. After that, the sub pixel rendering (SPR) technology and the specific mapping relationship, and then through the brightness of the gray-scale domain to the conversion process will be RGB graphics data into RGBW graphics data, but this method also has some problems, during the process of RGB data of image being converted into RGBW, due to the panel process and pixel limits, the gain of the saturated color is actually less than the gain of unsaturated color, which makes the screen appears a phenomenon that the saturated color is darker than the unsaturated color during the screen display. For the picture with a higher saturated color ratio, the image displayed by the RGBW system is darker than the image displayed by the RGB system, which may not be able to achieve the expected effect and may reduce the display effect of the terminal due to the high demand on the picture.

SUMMARY

The embodiments of the disclosure provide an image processing method and device thereof, which can improve the display brightness of the saturated color, reduce the brightness deviation between the unsaturated color and the saturated color, and improve the display effect of the terminal.

A first aspect of the embodiments of the disclosure provides an image processing method, which may include:

detecting a saturated color ratio of a current frame picture in an acquired target image;

acquiring a pulse width modulation (PWM) duty ratio of a backlight circuit configured to display the current frame picture according to the saturated color ratio;

acquiring a gain coefficient configured to perform an image format conversion on the current frame picture according to the saturated color ratio; and converting the current frame image from a first image format to a second image format based on an image conversion algorithm and the adoption of the gain coefficient and controlling the backlight circuit to display the current frame picture control the backlight circuit to display the current frame picture of the second image format by a backlight brightness corresponding to the PWM duty ratio.

A second aspect of the embodiments of the disclosure provides an image processing device, which may include:

an image detecting unit, configured to detect a saturated color ratio of a current frame picture in an acquired target image;

a duty ratio acquiring unit, configured to acquire a PWM duty ratio of a backlight circuit configured to display the current frame picture according to the saturated color ratio;

a coefficient acquiring unit, configured to acquire a gain coefficient configured to perform an image format conversion of the current frame picture according to the saturated color ratio; and a picture display unit, configured to convert the current frame picture from a first image format to a second image format based on an image conversion algorithm and the adoption of the gain coefficient and to control the backlight circuit to display the current frame picture of the second image format by a backlight brightness corresponding to the PWM duty ratio.

A third aspect of the embodiments of the disclosure provides an electronic device, which may include a housing, a processor, a memory, a circuit board, and a power circuit, and the circuit board is disposed inside a space enclosed by the housing and the processor and the memory are disposed on the circuit board. The power circuit is configured to supply power to each circuit or device of the electronic device; the memory is configured to store executable program code; and the processor runs a program corresponding to the executable program code by reading executable program code stored in the memory so as to perform the following steps:

detecting a saturated color ratio of a current frame picture in an acquired target image;

acquiring a PWM duty ratio of a backlight circuit configured to display the current frame picture according to the saturated color ratio;

acquiring a gain coefficient configured to perform an image format conversion on the current frame picture according to the saturated color ratio;

converting the current frame image from a first image format to a second image format based on an image conversion algorithm and the adoption of the gain coefficient and controlling the backlight circuit to display the current frame picture of the second image format by a backlight brightness corresponding to the PWM duty ratio.

In this embodiment of the disclosure, by detecting a saturated color ratio of a current frame picture in an acquired target image, a PWM duty ratio of a backlight circuit configured to display the current frame picture and a gain coefficient configured to perform an image format conversion of the current frame picture are acquired according to the saturated color ratio, and finally, the current frame image is converted from a first image format to a second image format based on an image conversion algorithm and the adoption of the gain coefficient, and the backlight circuit is controlled to display the current frame picture of the second image format by the backlight brightness corresponding to the PWM duty ratio. By detecting the saturated color ratio of the current frame picture of the acquired target image to acquire a corresponding PWM duty ratio and gain coefficient, the method can intelligently control the backlight brightness of the display picture and the gain coefficient during the format conversion to solve the problem that the unsaturated color is darker than the saturated color when the picture is displayed, and the display effect of the terminal is improved.

BRIEF DESCRIPTION OF THE DRAWINGS

In order to illustrate technical schemes of the disclosure or the prior art more clearly, the following section briefly introduces drawings used to describe the embodiments and prior art. Obviously, the drawing in the following descriptions is just some embodiments of the disclosure. The ordinary person in the related art can acquire the other drawings according to these drawings without offering creative effort.

DETAILED DESCRIPTION OF PREFERRED EMBODIMENTS

The following sections offer a clear, complete description of this disclosure in combination with the embodiments and accompanying drawings. Obviously, the embodiments described herein are only a part of, but not all of the embodiments of this disclosure. In view of the embodiments described herein, any other embodiment obtained by those of ordinary skill in the art skilled in this art without offering creative effort is included in a scope claimed by the disclosure.

The image processing method according to an embodiment of the disclosure can be applied to a video image display format conversion of a mobile terminal, such as a video shot by the mobile terminal mobile and a video downloaded from a network or a dynamic image of graphics interchange format (GIF). For example, detecting a saturated color ratio of a current frame picture in an acquired target image; acquiring a PWM duty ratio of a backlight circuit configured to display the current frame picture according to the saturated color ratio; acquiring a gain coefficient configured to perform an image format conversion on the current frame picture according to the saturated color ratio; converting the current frame image from a first image format to a second image format based on an image conversion algorithm and the adoption of the gain coefficient, and controlling the backlight circuit to display the current frame picture control the backlight circuit to display the current frame picture of the second image format by a backlight brightness corresponding to the PWM duty ratio. Therefore, the problem that the saturated color is darker than the non-saturated color is solved when displaying a picture with a high ratio of saturated colors, and the display effect of the terminal is improved.

The image processing device according to the embodiment of the disclosure may include a terminal device with playing video images such as a tablet, a smart phone, a personal computer (PC), a notebook computer, a handheld computer, and a mobile Internet device (MID).

Figure 1:
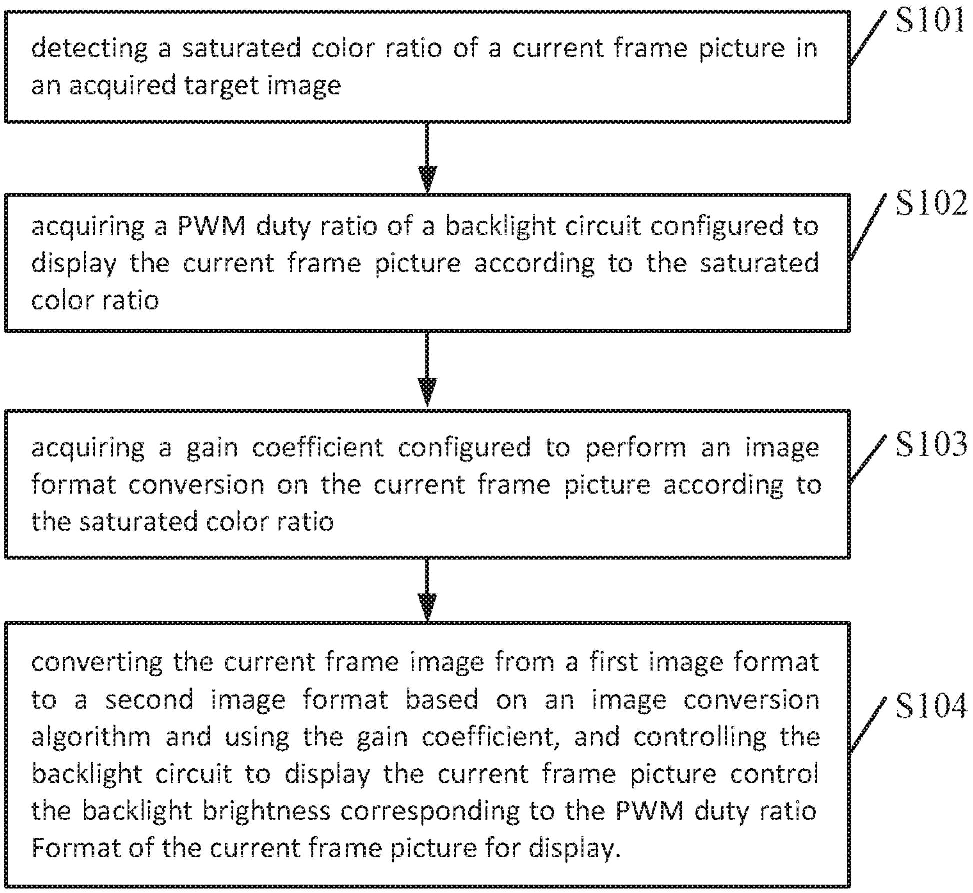
FIG. 1 is a schematic flow of an image processing method according to an embodiment of the disclosure.

Referring to FIG. 1, a schematic flowchart of an image processing method according to an embodiment of the disclosure is provided. As shown in FIG. 1, the method of the embodiment of the disclosure may include the following steps S101 to S104.

S101: detecting a saturated color ratio of a current frame picture in an acquired target image.

Specifically, the image processing device may detect the saturated color ratio of the current frame picture in the acquired target image. It can be understood that the target image includes the video of the image and the dynamic video of the multiple images, for example, the image captured by the image processing device and a video or a GIF dynamic picture downloaded by the image processing device from a terminal; the current frame picture may be a frame picture at a certain moment specified by a user or a first frame picture defaulted by an device, for example, an image processing device plays an image video, the default is to start playing from the first frame picture, or start playing from a moment specified by the user; the saturated color is a color without noise and gray but with a certain brightness, and in general, a solid color is used as a saturated color; when the image processing device receives an instruction of playing a video or a GIF dynamic image, the current frame picture of the target image is acquired, and the ratio of the solid color in the image is detected.

S102: acquiring a PWM duty ratio of a backlight circuit configured to display the current frame picture according to the saturated color ratio.

Specifically, the image processing device may acquire a PWM duty ratio of a backlight circuit configured to display the current frame picture according to the saturated color ratio. It can be understood that the backlight circuit displays a picture of a current frame picture, and the PWM duty ratio is a proportion of the whole period with a high level in one pulse cycle, output by the digital output of the microprocessor to control the analog circuit, configured to control the brightness of the backlight circuit; after the image processing device acquires the saturated color ratio, the PWM duty ratio is acquired to display the current frame image according to the relationship between the saturated color ratio and the PWM duty ratio.

S103: acquiring a gain coefficient configured to perform an image format conversion on the current frame picture according to the saturated color ratio.

Specifically, the image processing device may acquire the gain coefficient configured to perform the image format conversion on the current frame picture according to the saturated color ratio. It can be understood that the image display format includes RGB images, RGBW images, and RGBA images. For example, when converting RGB images into RGBW images, a white channel is added to the original three channels of red, green, and blue, and the gain coefficient is configured to converting the image format of a picture; after the image processing device acquires the saturated color ratio, the gain coefficient is acquired according to the relationship between the saturated color ratio and the gain coefficient to convert the image format of the current frame picture.

S104: converting the current frame image from a first image format to a second image format based on an image conversion algorithm and the adoption of the gain coefficient and controlling the backlight circuit to display the current frame picture control the backlight circuit to display the current frame picture of the second image format by a backlight brightness corresponding to the PWM duty ratio Specifically, the image processing device may convert the current frame picture from the first image format to the second image format based on the image conversion algorithm and the adoption of the gain coefficient and control the backlight circuit to display the current frame picture of the second image format by a backlight brightness corresponding to the PWM duty ratio. It can be understood that, an image conversion algorithm is adopted to convert the format of the current frame picture according to the gain coefficient and the backlight circuit is controlled to display the image after the format conversion according to the PWM duty ratio. For example, an RGB image is converted into an RGBW image, the image processing device acquires a gain coefficient and a PWM duty ratio to convert the RGB image with the gain coefficient and controls the backlight circuit to display the current frame picture of the second image format by a backlight brightness corresponding to the PWM duty ratio.

In this embodiment of the disclosure, by detecting a saturated color ratio of a current frame picture in an acquired target image, a PWM duty ratio of a backlight circuit configured to display the current frame picture and a gain coefficient configured to perform an image format conversion of the current frame picture are acquired according to the saturated color ratio, and finally the current frame image is converted from a first image format to a second image format based on an image conversion algorithm and the adoption of the gain coefficient, and the backlight circuit is controlled to display the current frame picture of the second image format by a backlight brightness corresponding to the PWM duty ratio. By detecting the saturated color ratio of the current frame picture of the acquired target image to acquire a corresponding PWM duty ratio and gain coefficient, the method can intelligently control the backlight brightness of the display picture and the gain coefficient during the format conversion to solve the problem that the unsaturated color is darker than the saturated color when the picture is displayed, and the display effect of the terminal is improved.

Figure 2:
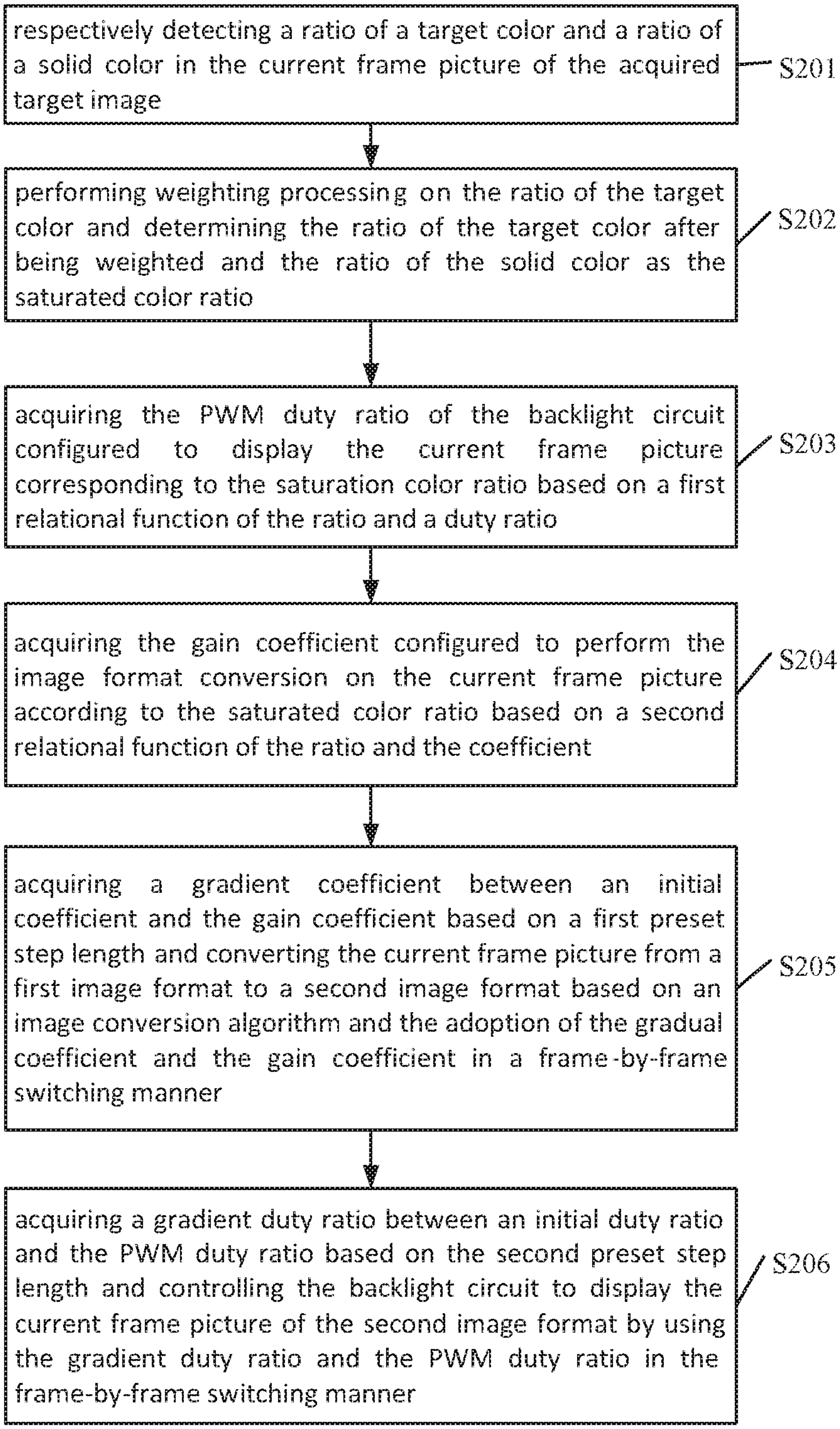
FIG. 2 is a schematic flow chart of another image processing method according to an embodiment of the disclosure.

Referring to FIG. 2, a schematic flowchart of an image processing method according to an embodiment of the disclosure is provided. As shown in FIG. 2, an embodiment of the method of the disclosure may include the following steps S201 to S206.

S201: respectively detecting a ratio of a target color and a ratio of a solid color in the current frame picture of the acquired target image;

Specifically, the image processing device may separately detect the ratio of the target color and the ratio of the solid color in the current frame of the acquired target image. It can be understood that the target color is greatly influenced by the background color when being displayed. For example, the yellow color is greatly influenced by the background color when the image is displayed. After the image processing device acquires the current frame image in the target image, the ratios of the yellow color and the solid color in the image are respectively detected ratio.

S202: performing weighting processing on the ratio of the target color and determining the ratio of the target color after being weighted and the ratio of the solid color as the saturated color ratio.

Specifically, the image processing device may perform weighted processing on the ratio of the target color and determining the ratio of the target color after being weighted and the ratio of the solid color as the saturated color ratio. It is understandable that the weighting processing is to change the ratio of the target color and the target color is greatly influenced by the background color when being displayed. When the image format conversion is performed, in the image, the display effect of the target color area is darker than the display effect of other saturated color areas. Therefore, increasing the ratio coefficient of the target color can reduce the display deviation of the brightness between the target color area and the other saturated color areas after the image format conversion. The ratios of the target color and the solid color after weighted processing are determined as the saturated color ratio, for example, when the solid color ratio is 10%, and the yellow color ratio is 1%, the yellow color ratio is weighted by 3 times, and the yellow color ratio after weighting processing and the solid color is 12%, then the saturated color ratio becomes 12%.

S203: acquiring the PWM duty ratio of the backlight circuit configured to display the current frame picture corresponding to the saturated color ratio based on a first relational function of the ratio and a duty ratio;

specifically, the image processing device acquires the PWM duty ratio of the backlight circuit configured to display the current frame picture corresponding to the saturated color ratio based on a first relational function of the ratio and a duty ratio. It can be understood that, the first relational function is configured to represent the correspondence between the saturated color ratio and the PWM duty ratio. The first relational function may be pre-stored in the device, and the image processing device acquires the saturated color ratio and calls the first relational function to acquire a PWM duty ratio of the backlight circuit configured to display the current frame picture corresponding to the saturated color ratio.

S204: acquiring the gain coefficient configured to perform the image format conversion on the current frame picture according to the saturated color ratio based on a second relational function of the ratio and the coefficient;

specifically, the image processing device acquires the gain coefficient configured to perform the image format conversion on the current frame picture according to the saturated color ratio based on a second relational function of the ratio and the coefficient. It can be understood that, the second relational function is configured to represent the correspondence between the saturated color ratio and the gain coefficient. The second relational function may be pre-stored in the device, and the image processing device acquires the saturated color ratio and calls the second relational function to acquire the gain coefficient configured to perform an image format conversion on the current frame picture according to the saturated color ratio.

S205: acquiring a gradient coefficient between an initial coefficient and the gain coefficient based on a first preset step length and converting the current frame picture from a first image format to a second image format based on an image conversion algorithm and the adoption of the gradual coefficient and the gain coefficient in a frame-by-frame switching manner;

specifically, the image processing device acquires the current frame picture from a first image format to a second image format based on an image conversion algorithm and the adoption of the gradual coefficient and the gain coefficient in a frame-by-frame switching manner. It can be understood that the frame-by-frame switching manner is a method of multiple switching, and the image processing device acquires an initial coefficient, the initial coefficient undergoes multiple switching and finally switches to the gain coefficient, and the gradual coefficient is a gain coefficient after the initial coefficient is switched, the first preset step is a change amount of the initial coefficient switching to a gradual coefficient; based on the image conversion algorithm, the image processing device converts the current frame picture from the first image format to the second image format by using the gradual coefficient and the gain coefficient; For example, based on the RGBW conversion algorithm, the image processing device converts RGB images into RGBW images, the initial coefficient is 1.1, the gain coefficient is 1.4, the first preset step length is 0.1, and after one frame-by-frame switching, the initial coefficient of 1.1 switches to a gradual coefficient of 1.2; based on the RGBW conversion algorithm, the image processing device converts the RGB image into the RGBW image with a gradient coefficient of 1.2, and after one frame-by-frame switching, the gradient coefficient of 1.2 is switched to a gradient coefficient of 1.3; based on the RGBW conversion algorithm, the image processing device converts RGB images into RGBW images with a gradient coefficient of 1.3, after one frame-by-frame switching again, the gradient coefficient 1.3 is switched to a gain coefficient of 1.4; based on the RGBW conversion algorithm, the image processing device converts the RGB image into an RGBW image with a gain coefficient of 1.4.

S206: acquiring a gradient duty ratio between an initial duty ratio and the PWM duty ratio based on the second preset step length and controlling the backlight circuit to display the current frame picture of the second image format by using the gradient duty ratio and the PWM duty ratio in the frame-by-frame switching manner.

Specifically, the image processing device acquires a gradient duty ratio between an initial duty ratio and the PWM duty ratio based on the second preset step length and controls the backlight circuit to display the current frame picture of the second image format by using the gradient duty ratio and the PWM duty ratio in the frame-by-frame switching manner. It can be understood that the frame-by-frame switching manner is a method of multiple switching, and the image processing device acquires an initial duty ratio, the initial duty ratio undergoes multiple switching and finally switches to the PWM duty ratio, and the gradual duty ratio is a PWM duty ratio after the initial duty ratio is switched, the second preset step length is a change amount of the initial duty ratio switching to a gradual duty ratio; the image processing device controls the backlight circuit to display the current frame picture of the second image format by using the gradual duty ratio and the PWM duty ratio; For example, based on the RGBW conversion algorithm, the image processing device converts RGB images into RGBW images, the initial duty ratio is 0.5, the PWM duty ratio is 0.8, the second preset step length is 0.1, After one frame-by-frame switching, the initial duty ratio 0.5 is switched to the gradient duty ratio 0.6. The image processing device controls the backlight circuit to display the current frame picture of the RGBW image with a gradient duty ratio of 0.6; after one frame-by-frame switching again, the gradient duty ratio 0.6 is switched to the gradient duty ratio 0.7. The image processing device controls the backlight circuit to display the current frame picture of the RGBW image with a gradient duty ratio of 0.7; after one frame-by-frame switching again, the gradient duty ratio 0.7 is switched to the PWM duty ratio 0.8. The image processing device controls the backlight circuit to display the current frame picture of the RGBW image with a PWM duty ratio of 0.8.

In this embodiment of the disclosure, by detecting a saturated color ratio of a current frame picture in an acquired target image, a PWM duty ratio of a backlight circuit configured to display the current frame picture and a gain coefficient configured to perform an image format conversion of the current frame picture are acquired according to the saturated color ratio, and finally the current frame image is converted from a first image format to a second image format based on an image conversion algorithm and the adoption of the gain coefficient, and the backlight circuit is controlled to display the current frame picture of the second image format by a backlight brightness corresponding to the PWM duty ratio. By detecting the saturated color ratio of the current frame picture of the acquired target image to acquire a corresponding PWM duty ratio and gain coefficient, the current frame picture is converted from a first image format to a second image format by using the gradual coefficient and the gain coefficient in a frame-by-frame switching manner, and the backlight circuit is controlled to display the current frame picture of the second image format by using the gradient duty ratio and the PWM duty ratio in the frame-by-frame switching manner. The method can intelligently control the backlight brightness of the display picture and the gain coefficient during the format conversion to solve the problem that the unsaturated color is darker than the saturated color when the picture is displayed and can avoid the flickering phenomenon of the picture with different saturated color ratios in switching and, thereby improving the display effect of the terminal.

Figure 3:
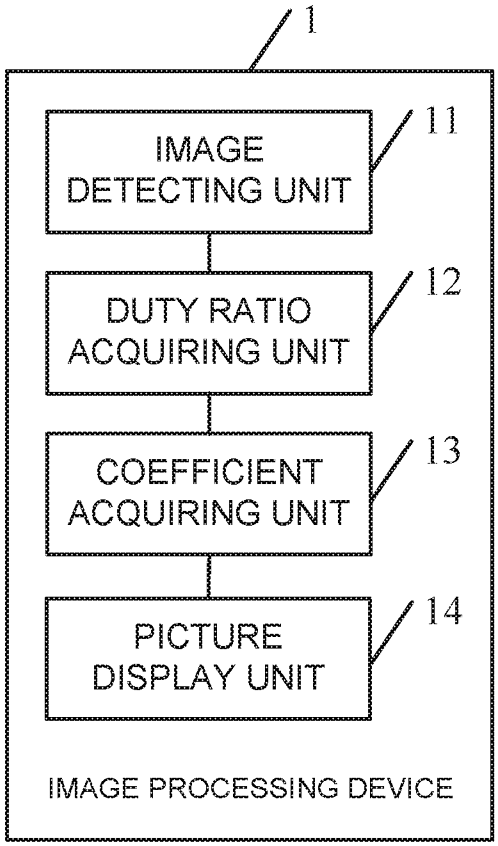
FIG. 3 is a schematic structural diagram of an image processing device according to an embodiment of the disclosure.

Referring to FIG. 3, a schematic structural diagram of an image processing device according to an embodiment of the disclosure is provided. As shown in FIG. 3, the image processing device 1 according to the embodiment of the disclosure may include an image detecting unit 11, a duty ratio acquiring unit 12, a coefficient acquiring unit 13, and a picture display unit 14.

The image detecting unit 11 is configured to detect a saturated color ratio of a current frame picture in an acquired target image;

Specifically, the image detecting unit 11 may detect the saturated color ratio of the current frame picture in the acquired target image. It can be understood that the target image includes the video of the image and the dynamic video of the multiple images, for example, the image captured by the image processing device and a video or a GIF dynamic picture downloaded by the image processing device from a terminal; the current frame picture may be a frame picture at a certain moment specified by a user or a first frame picture defaulted by an device, for example, an image processing device plays an image video, the default is to start playing from the first frame picture, or start playing from a moment specified by the user; the saturated color is a color without noise and gray but with a certain brightness, and in general, a solid color is used as a saturated color; when the image processing device receives an instruction of playing a video or a GIF dynamic image, the current frame picture of the target image is acquired, and the ratio of the solid color in the image is detected.

The duty ratio acquiring unit 12 is configured to acquire a PWM duty ratio of a backlight circuit configured to display the current frame picture according to the saturated color ratio;

specifically, the duty ratio acquiring unit 12 may acquire the PWM duty ratio of the backlight circuit configured to display the current frame picture corresponding to the saturated color ratio based on a first relational function of the ratio and a duty ratio. It can be understood that the backlight circuit displays a picture of a current frame picture, and the PWM duty ratio is a proportion of the whole period with a high level in one pulse cycle, output by the digital output of the microprocessor to control the analog circuit, configured to control the brightness of the backlight circuit; the first relational function is configured to represent the correspondence between the saturated color ratio and the PWM duty ratio. The first relational function may be pre-stored in the device, and the image processing device acquires the saturated color ratio and calls the first relational function to acquire a PWM duty ratio of the backlight circuit configured to display the current frame picture corresponding to the saturated color ratio.

The coefficient acquiring unit 13 is configured to acquire a gain coefficient configured to perform an image format conversion of the current frame picture according to the saturated color ratio;

specifically, the coefficient acquiring unit 13 acquires the gain coefficient configured to perform the image format conversion on the current frame picture according to the saturated color ratio based on a second relational function of the ratio and the coefficient. It can be understood that the image display format includes RGB images, RGBW images, and RGBA images. For example, when converting RGB images into RGBW images, a white channel is added to the original three channels of red, green, and blue, and the gain coefficient is configured to converting the image format of a picture; it can be understood that, the second relational function is configured to represent the correspondence between the saturated color ratio and the gain coefficient. The second relational function may be pre-stored in the device, and the image processing device acquires the saturated color ratio and calls the second relational function to acquire the gain coefficient configured to perform an image format conversion on the current frame picture according to the saturated color ratio.

The picture display unit 14 is configured to convert the current frame picture from a first image format to a second image format based on an image conversion algorithm and the adoption of the gain coefficient and to control the backlight circuit to display the current frame picture of the second image format by a backlight brightness corresponding to the PWM duty ratio.

Specifically, the picture display unit 14 may convert the current frame picture from the first image format to the second image format based on the image conversion algorithm and the adoption of the gain coefficient and control the backlight circuit to display the current frame picture of the second image format by a backlight brightness corresponding to the PWM duty ratio. It can be understood that, an image conversion algorithm is adopted to convert the format of the current frame picture according to the gain coefficient and the backlight circuit is controlled to display the image after the format conversion according to the PWM duty ratio. For example, an RGB image is converted into an RGBW image, the image processing device acquires a gain coefficient and a PWM duty ratio to convert the RGB image with the gain coefficient and controls the backlight circuit to display the current frame picture of the second image format by a backlight brightness corresponding to the PWM duty ratio.

Figure 4:
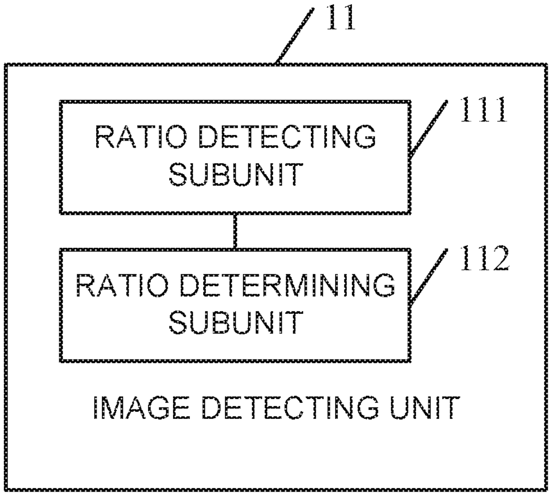
FIG. 4 is a schematic structural view of an image detecting unit according to an embodiment of the disclosure.

Specifically, referring to FIG. 4, a schematic structural diagram of an image detecting unit 11 according to an embodiment of the disclosure is provided. As shown in FIG. 4, the image detecting unit 11 in this embodiment of the disclosure may include a ratio detecting subunit 111 and a ratio determining subunit 112.

The ratio detecting subunit is configured to respectively detect a ratio of a target color and a ratio of a solid color in the current frame of the acquired target image;

Specifically, the ratio detecting subunit 111 may respectively detect a ratio of a target color and a ratio of a solid color in the current frame of the acquired target image. It is understandable that the target color is a color which is greatly influenced by the background color when being displayed, and the solid color is a saturated color in the picture. For example, the yellow color is greatly influenced by the background color when the picture is displayed, and after the image processing device acquires the current frame picture in the target image, the ratios of yellow and the solid color in the picture are respectively detected.

The ratio determining subunit 112 is configured to perform weighting processing on the ratio of the target color and to determine the ratio of the target color after being weighted and the ratio of the solid color as the saturated color ratio.

Specifically, the ratio determining subunit 112 may perform weighting processing on the ratio of the target color and determine the ratio of the weighted target color and the ratio of the solid color as the saturated color ratio. It is understandable that the weighting processing is to change the ratio of the target color and the target color is greatly influenced by the background color when being displayed. When the image format conversion is performed, in the image, the display effect of the target color area is darker than the display effect of other saturated color areas. Therefore, increasing the ratio coefficient of the target color can reduce the display deviation of the brightness between the target color area and the other saturated color areas after the image format conversion. The ratios of the target color and the solid color after weighted processing are determined as the saturated color ratio, for example, when the solid color ratio is 10%, and the yellow color ratio is 1%, the yellow color ratio is weighted by 3 times, and the yellow color ratio after weighting processing and the solid color is 12%, then the saturated color ratio becomes 12%.

Figure 5:
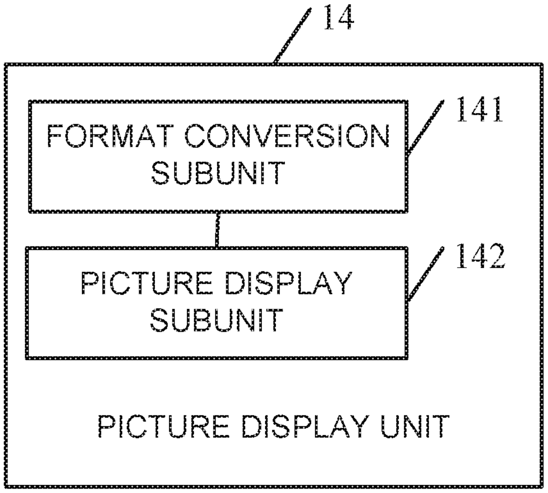
FIG. 5 is a schematic structural view of an image display unit according to an embodiment of the disclosure.

Specifically, referring to FIG. 5, a schematic structural diagram of a picture display unit 14 according to an embodiment of the disclosure is provided. As shown in FIG. 5, the picture display unit 14 in this embodiment of the disclosure may include a format conversion subunit 141 and a picture display subunit 142.

The format conversion subunit 141 is configured to acquire a gradient coefficient between an initial coefficient and the gain coefficient based on a first preset step size and to convert the current frame picture from a first image format to a second image format based on an image conversion algorithm and the adoption of the gradual coefficient and the gain coefficient in a frame-by-frame switching manner;

Specifically, the format conversion subunit 141 acquires a gradient coefficient between an initial coefficient and the gain coefficient based on a first preset step length and converts the current frame picture from a first image format to a second image format based on an image conversion algorithm and the adoption of the gradual coefficient and the gain coefficient in a frame-by-frame switching manner. It can be understood that the frame-by-frame switching manner is a method of multiple switching, and the image processing device acquires an initial coefficient, the initial coefficient undergoes multiple switching and finally switches to the gain coefficient, and the gradual coefficient is a gain coefficient after the initial coefficient is switched, the first preset step is a change amount of the initial coefficient switching to the gradual coefficient; based on the image conversion algorithm, the image processing device converts the current frame picture from the first image format to the second image format by using the gradual coefficient and the gain coefficient; For example, based on the RGBW conversion algorithm, the image processing device converts RGB images into RGBW images, the initial coefficient is 1.1, the gain coefficient is 1.4, the first preset step length is 0.1, and after one frame-by-frame switching, the initial coefficient of 1.1 switches to a gradual coefficient of 1.2; based on the RGBW conversion algorithm, the image processing device converts RGB images into RGBW images with a gradient coefficient of 1.2; after one frame-by-frame switching, the gradual change factor of 1.2 is switched to a gradual change factor of 1.3, Based on the RGBW conversion algorithm, the image processing device converts the RGB image into an RGBW image with a gradual coefficient of 1.3, after one frame-by-frame switching again, the gradient coefficient 1.3 is switched to a gain coefficient of 1.4; based on the RGBW conversion algorithm, the image processing device converts the RGB image into an RGBW image with a gain coefficient of 1.4.

The picture display subunit 142 is configured to acquire a gradient duty ratio between an initial duty ratio and the PWM duty ratio based on the second preset step length and to control the backlight circuit to display the current frame picture of the second image format by using the gradient duty ratio and the PWM duty ratio in the frame-by-frame switching manner.

Specifically, the picture display subunit 142 acquires a gradient duty ratio between an initial duty ratio and the PWM duty ratio based on the second preset step length and controls the backlight circuit to display the current frame picture of the second image format by using the gradient duty ratio and the PWM duty ratio in the frame-by-frame switching manner. It can be understood that the frame-by-frame switching manner is a method of multiple switching, and the image processing device acquires an initial duty ratio, the initial duty ratio undergoes multiple switching and finally switches to the PWM duty ratio, and the gradual duty ratio is a PWM duty ratio after the initial duty ratio is switched, the second preset step length is a change amount of the initial duty ratio switching to a gradual duty ratio; the image processing device controls the backlight circuit to display the current frame picture of the second image format by using the gradual duty ratio and the PWM duty ratio; for example, based on the RGBW conversion algorithm, the image processing device converts RGB images into RGBW images, the initial duty ratio is 0.5, the PWM duty ratio is 0.8, the second preset step length is 0.1, after one frame-by-frame switching, the initial duty ratio 0.5 is switched to the gradient duty ratio 0.6. The image processing device controls the backlight circuit to display the current frame picture of the RGBW image with a gradient duty ratio of 0.6; after one frame-by-frame switching again, the gradient duty ratio 0.6 is switched to the gradient duty ratio 0.7. The image processing device controls the backlight circuit to display the current frame picture of the RGBW image with a gradient duty ratio of 0.7; after one frame-by-frame switching again, the gradient duty ratio 0.7 is switched to the PWM duty ratio 0.8. The image processing device controls the backlight circuit to display the current frame picture of the RGBW image with a PWM duty ratio of 0.8.

In this embodiment of the disclosure, by detecting a saturated color ratio of a current frame picture in an acquired target image, a PWM duty ratio of a backlight circuit configured to display the current frame picture and a gain coefficient configured to perform an image format conversion of the current frame picture are acquired according to the saturated color ratio, and finally the current frame image is converted from a first image format to a second image format based on an image conversion algorithm and the adoption of the gain coefficient, and the backlight circuit is controlled to display the current frame picture control the backlight circuit to display the current frame picture of the second image format by a backlight brightness corresponding to the PWM duty ratio. By detecting the saturated color ratio of the current frame picture of the acquired target image to acquire a corresponding PWM duty ratio and gain coefficient, the current frame picture is converted from a first image format to a second image format by using the gradual coefficient and the gain coefficient in a frame-by-frame switching manner, and the backlight circuit is controlled to display the current frame picture of the second image format by using the gradient duty ratio and the PWM duty ratio in the frame-by-frame switching manner, the method can intelligently control the backlight brightness of the display picture and the gain coefficient during the format conversion to solve the problem that the unsaturated color is darker than the saturated color when the picture is displayed and can avoid the flickering phenomenon of the picture with different saturated color ratios in switching and, thereby improving the display effect of the terminal.

Figure 6:
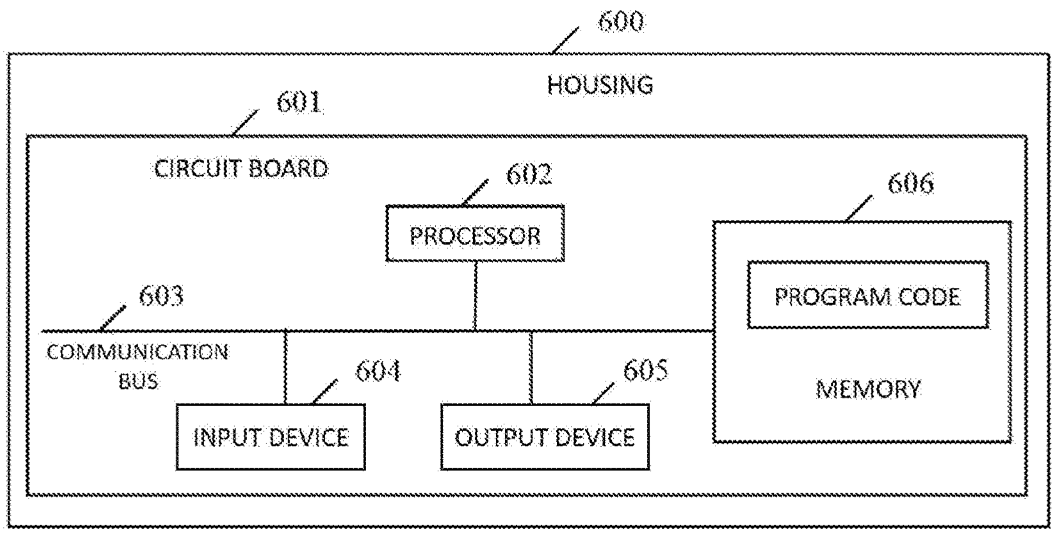
FIG. 6 is a schematic structural diagram of an electronic device according to an embodiment of the disclosure.

Referring to FIG. 6, a schematic structural diagram of an electronic device is provided according to an embodiment of the disclosure. As shown in FIG. 6, the electronic device in this embodiment of the disclosure may include a housing 600, a circuit board 601, a processor 602, a communication bus 603, an input device 604, an output device 605, and a memory 606; the circuit board 601 is disposed inside the space surrounded by the housing 600. The processor 602, the communication bus 603, the memory 606, the input device 604, and the output device 605 are disposed on the circuit board 601. The communication bus 603 is configured to implement connection communication between these components. The memory 606 may be a high-speed RAM memory or a non-volatile memory, such as at least one disk memory. Optionally, the memory 606 may also be at least one storage device located away from the processor 602. The processor 602 may be combined with the image processing device described with reference to FIGS. 3 to 5, the executable program code is stored in the memory 606; and the processor 602 runs the program corresponding to the executable program code stored in the memory 606 by reading the executable program code for performing the following steps:

the control input device 604 detects a saturated color ratio of a current frame picture in an acquired target image;

the control input device 604 acquires a PWM duty ratio of a backlight circuit configured to display the current frame picture according to the saturated color ratio;

the control input device 604 acquires a gain coefficient configured to perform an image format conversion on the current frame picture according to the saturated color ratio;

the control processor 602 converts the current frame picture from a first image format to a second image format based on an image conversion algorithm and the adoption of the gain coefficient and controls the backlight circuit to display the current frame picture of the second image format by a backlight brightness corresponding to the PWM duty ratio.

In an optional embodiment, the control processor 602 detects the saturated color ratio of the current frame picture in the acquired target image and invokes the executable program code stored in the memory 606 to execute the following specific operations:

respectively detecting a ratio of a target color and a ratio of a solid color in the current frame picture of the acquired target image; and performing weighting processing on the ratio of the target color and determining the ratio of the target color after being weighted and the ratio of the solid color as the saturated color ratio.

In an optional embodiment, according to the saturated color ratio, by invoking the executable program code stored in the memory 606, the control processor 602 acquires a PWM duty ratio of a backlight circuit configured to display the current frame picture, the following specific operations is executed:

acquiring the PWM duty ratio of the backlight circuit configured to display the current frame picture corresponding to the saturated color ratio based on a first relational function of the ratio and a duty ratio.

In an optional embodiment, according to the saturated color ratio, by invoking the executable program code stored in the memory 606, the control processor 602 acquires a gain coefficient configured to perform an image format conversion on the current frame picture, the following specific operations is executed:

acquiring the gain coefficient configured to perform the image format conversion on the current frame picture according to the saturated color ratio based on a second relational function of the ratio and the coefficient;

In an optional embodiment, based on the image conversion algorithm and the adoption of the gain coefficient and invoking the executable program code stored in the memory 606, the control processor 602 converts the current frame picture from the first image format to the second image format, and control the backlight circuit to display the current frame picture of the second image format by a backlight brightness corresponding to the PWM duty ratio. The following specific operations is executed:

acquiring a gradient coefficient between an initial coefficient and the gain coefficient based on a first preset step length and converting the current frame picture from a first image format to a second image format based on an image conversion algorithm and the adoption of the gradual coefficient and the gain coefficient in a frame-by-frame switching manner; and acquiring a gradient duty ratio between an initial duty ratio and the PWM duty ratio based on the second preset step length and controlling the backlight circuit to display the current frame picture of the second image format by using the gradient duty ratio and the PWM duty ratio in the frame-by-frame switching manner.

In this embodiment of the disclosure, by detecting a saturated color ratio of a current frame picture in an acquired target image, a PWM duty ratio of a backlight circuit configured to display the current frame picture and a gain coefficient configured to perform an image format conversion of the current frame picture are acquired according to the saturated color ratio, and finally the current frame image is converted from a first image format to a second image format based on an image conversion algorithm and the adoption of the gain coefficient, and the backlight circuit is controlled to display the current frame picture control the backlight circuit to display the current frame picture of the second image format by a backlight brightness corresponding to the PWM duty ratio. By detecting a saturated color ratio of a current frame picture in an acquired target image, the current frame picture is converted from a first image format to a second image format by using the gradual coefficient and the gain coefficient in a frame-by-frame switching manner, and the backlight circuit is controlled to display the current frame picture of the second image format by using the gradient duty ratio and the PWM duty ratio in the frame-by-frame switching manner; the method can intelligently control the backlight brightness of the display picture and the gain coefficient during the format conversion to solve the problem that the unsaturated color is darker than the saturated color when the picture is displayed and can avoid the flickering phenomenon of the picture with different saturated color ratios in switching and, thereby improving the display effect of the terminal.

A person of ordinary skill in the art may understand that all or part of the processes for implementing the methods in the foregoing embodiments may be implemented by a computer program instructing relevant hardware. The program may be stored in a computer-readable storage medium. When the program is executed, the flow of the embodiments of the above methods may be included. And the storage medium may be a magnetic disk, an optical disk, read-only memory (ROM) or a random access memory (RAM), and the like.

The disclosure is only the preferred embodiments of the disclosure, and certainly cannot be used to limit the scope of the disclosure. Therefore, equivalent changes made according to the claims of the disclosure are still within the scope of the disclosure.

What is claimed is:

1. An image processing method for a current frame picture going to be displayed on a display, comprising:

detecting a saturated color ratio of the current frame picture in an acquired target image, wherein the saturated color ratio is summation of a ratio of a solid color and a weighted result of a ratio of a target color;

acquiring a pulse-width modulation (PWM) duty ratio of a backlight circuit according to the saturated color ratio, wherein the backlight circuit is driven with the PWM duty ratio to display the current frame picture;

acquiring a gain coefficient according to the saturated color ratio, wherein the gain coefficient is configured to perform an image format conversion on the current frame picture;

converting the current frame picture from a first image format to a second image format based on an image conversion algorithm and the gain coefficient and controlling to drive the backlight circuit with the PWM duty ratio to display the current frame picture of the second image format at a backlight brightness.

2. The image processing method according to claim 1, wherein the step of detecting the saturated color ratio of the current frame picture in the acquired target image comprises:

respectively detecting the ratio of the target color and the ratio of the solid color in the current frame picture of the acquired target image; and performing weighting processing on the ratio of the target color to obtain the weighted ratio of the target color and summing the weighted ratio of the target color and the ratio of the solid color to obtain the saturated color ratio.

3. The image processing method according to claim 1, wherein the step of acquiring the PWM duty ratio of the backlight circuit according to the saturated color ratio, wherein the backlight circuit is driven with the PWM duty ratio to display the current frame picture:

acquiring the PWM duty ratio according to the saturated color ratio based on a first relational function of the saturated color ratio and the PWM duty ratio.

4. The image processing method according to claim 1, wherein the step of acquiring the gain coefficient according to the saturated color ratio, wherein the gain coefficient is configured to perform the image format conversion on the current frame picture:

acquiring the gain coefficient according to the saturated color ratio based on a second relational function of the saturated color ratio and the gain coefficient.

5. The image processing method according to claim 1, wherein the step of converting the current frame picture from the first image format to the second image format based on the image conversion algorithm and the gain coefficient, and controlling to drive the backlight circuit with the PWM duty ratio to display the current frame picture of the second image format at the backlight brightness comprises:

acquiring a gradient coefficient between an initial coefficient and the gain coefficient based on a first preset step size, converting the current frame picture from a first image format to a second image format based on the image conversion algorithm with the gradual coefficient in a frame-by-frame switching manner and increasing the gradual coefficient used in a first frame by the first preset step size as the gradual coefficient used in a second frame followed immediately after the first frame; and acquiring a gradient duty ratio between an initial duty ratio and the PWM duty ratio based on a second preset step length and controlling to drive the backlight circuit with the gradient duty ratio to display the current frame picture of the second image format in the frame-by-frame switching manner and increasing the gradual duty ratio used in the first frame by the second preset step length as the gradual duty ratio used in the second frame.

6. An image processing device, comprising:

an image detecting unit, configured to detect a saturated color ratio of a current frame picture in an acquired target image, wherein the saturated color ratio is summation of a ratio of a solid color and a weighted result of a ratio of a target color;

a duty ratio acquiring unit, configured to acquire a pulse-width modulation (PWM) duty ratio of a backlight circuit according to the saturated color ratio, wherein the backlight circuit is driven with the PWM duty ratio to display the current frame picture;

a coefficient acquiring unit, configured to acquire a gain coefficient according to the saturated color ratio, wherein the gain coefficient is configured to perform an image format conversion on the current frame picture; and a picture display unit, configured to convert the current frame picture from a first image format to a second image format based on an image conversion algorithm and the gain coefficient and to control to drive the backlight circuit with the PWM duty ratio to display the current frame picture of the second image format at a backlight brightness.

7. The image processing device according to claim 6, wherein the image detecting unit comprises:

a ratio detecting subunit, configured to respectively detect the ratio of the target color and the ratio of the solid color in the current frame picture of the acquired target image; and a ratio determining subunit, configured to perform weighting processing on the ratio of the target color to obtain the weighted ratio of the target color and to sum the weighted ratio of the target color and the ratio of the solid color to obtain the saturated color ratio.

8. The image processing device according to claim 6, wherein the duty ratio acquiring unit is specifically configured to acquire the PWM duty ratio according to the saturated color ratio based on a first relational function of the saturated color ratio and the PWM duty ratio.

9. The image processing device according to claim 6, wherein the gain coefficient acquiring unit is specifically configured to acquire the gain coefficient according to the saturated color ratio based on a second relational function of the saturated color ratio and the gain coefficient.

10. The image processing device according to claim 6, wherein the picture display unit comprises:

a format conversion subunit, configured to acquire a gradient coefficient between an initial coefficient and the gain coefficient based on a first preset step size and to convert the current frame picture from a first image format to a second image format based on the image conversion algorithm with the gradual coefficient in a frame-by-frame switching manner and to increase the gradual coefficient used in a first frame by the first preset step size as the gradual coefficient used in a second frame followed immediately after the first frame; and a picture display subunit, configured to acquire a gradient duty ratio between an initial duty ratio and the PWM duty ratio based on a second preset step length and to control to drive the backlight circuit with the gradient duty ratio to display the current frame picture of the second image format in the frame-by-frame switching manner and to increase the gradual duty ratio used in the first frame by the second preset step length as the gradual duty ratio used in the second frame.

* * * * *